(12) United States Patent
Shigeta

(10) Patent No.: US 12,293,627 B2
(45) Date of Patent: May 6, 2025

(54) CHIP RECOGNITION SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/993,166

(22) Filed: Nov. 23, 2022

(65) Prior Publication Data

US 2023/0079194 A1 Mar. 16, 2023

Related U.S. Application Data

(63) Continuation of application No. 17/325,568, filed on May 20, 2021, now Pat. No. 11,941,942, which is a
(Continued)

(30) Foreign Application Priority Data

Jan. 24, 2017 (JP) ................. 2017-010135

(51) Int. Cl.
*G07F 17/32* (2006.01)
*A63F 1/18* (2006.01)
(Continued)

(52) U.S. Cl.
CPC .............. *G07F 17/322* (2013.01); *A63F 1/18* (2013.01); *G06F 7/548* (2013.01);
(Continued)

(58) Field of Classification Search
CPC .................... G07F 17/3241; G07F 17/3248
See application file for complete search history.

(56) References Cited

U.S. PATENT DOCUMENTS

| 5,249,035 A | 9/1993 | Yamanaka |
| 5,781,647 A | 7/1998 | Fishbine et al. |
(Continued)

FOREIGN PATENT DOCUMENTS

| AU | 2007231813 A1 | 11/2008 |
| CA | 2947969 A1 | 11/2016 |
(Continued)

OTHER PUBLICATIONS

International Application No. PCT/JP2018/001173, International Search Report mailed Feb. 20, 2018.
(Continued)

*Primary Examiner* — James S. McClellan
(74) *Attorney, Agent, or Firm* — NORTON ROSE FULBRIGHT US LLP

(57) ABSTRACT

According to one embodiment, provided is a chip recognition system that recognizes a chip on a gaming table in an amusement place having the gaming table, the chip recognition system including: a game recording apparatus that records, as an image, a state of chips stacked on the gaming table, using a camera; an image analysis apparatus that performs an image analysis on the recorded image of the state of chips; a plurality of chip determination apparatuses including at least a first artificial intelligence apparatus that determines a number of the chips stacked, using an image analysis result obtained by the image analysis apparatus; and a second artificial intelligence apparatus that decides a correct number of the chips stacked, when the plurality of chip determination apparatuses obtain different determination results for the number of the chips stacked.

16 Claims, 6 Drawing Sheets

Related U.S. Application Data continuation of application No. 15/877,545, filed on Jan. 23, 2018, now Pat. No. 11,049,359.

(51) Int. Cl.
  *G06F 7/548* (2006.01)
  *A63F 11/00* (2006.01)

(52) U.S. Cl.
  CPC ...... *G07F 17/3241* (2013.01); *G07F 17/3248* (2013.01); *G07F 17/3272* (2013.01); *G07F 17/3288* (2013.01); *G07F 17/3293* (2013.01); *A63F 2011/0058* (2013.01)

(56) References Cited

U.S. PATENT DOCUMENTS

| | | | |
|---|---|---|---|
| 5,781,657 | A | 7/1998 | Masuda |
| 5,941,769 | A | 8/1999 | Order |
| 6,186,895 | B1 | 2/2001 | Oliver |
| 6,514,140 | B1 | 2/2003 | Storch |
| 6,626,750 | B2 | 9/2003 | Momemy |
| 7,938,722 | B2 | 5/2011 | Rowe et al. |
| 9,443,158 | B1 | 9/2016 | Haskins |
| 2003/0220136 | A1 | 11/2003 | Soltys et al. |
| 2005/0272501 | A1 | 12/2005 | Tran |
| 2005/0282622 | A1 | 12/2005 | Lindquist |
| 2006/0071429 | A1 | 4/2006 | Okujyo et al. |
| 2006/0160600 | A1 | 7/2006 | Hill et al. |
| 2006/0160608 | A1 | 7/2006 | Hill et al. |
| 2006/0199649 | A1 | 9/2006 | Soltys et al. |
| 2007/0293303 | A1 | 12/2007 | Shayesteh |
| 2008/0113783 | A1 | 5/2008 | Czyzewski et al. |
| 2009/0075725 | A1* | 3/2009 | Koyama ............... G07F 17/322 463/25 |
| 2010/0105486 | A1 | 4/2010 | Shigeta |
| 2011/0052049 | A1 | 3/2011 | Rajaraman et al. |
| 2011/0158653 | A1 | 6/2011 | Mazed |
| 2011/0280472 | A1 | 11/2011 | Wallack et al. |
| 2013/0275349 | A1 | 10/2013 | Tashiro et al. |
| 2015/0248591 | A1 | 9/2015 | Shi et al. |
| 2015/0312517 | A1 | 10/2015 | Hoyt et al. |
| 2016/0199649 | A1 | 7/2016 | Narnes et al. |
| 2016/0328604 | A1* | 11/2016 | Bulzacki ............... G06Q 10/063 |
| 2016/0335837 | A1 | 11/2016 | Shigeta |
| 2017/0098307 | A1 | 4/2017 | Chang |
| 2017/0161987 | A1 | 6/2017 | Bulzacki et al. |

FOREIGN PATENT DOCUMENTS

| | | | |
|---|---|---|---|
| CA | 2970692 | A1 | 11/2016 |
| CN | 1162926 | A | 10/1997 |
| CN | 1695174 | A | 11/2003 |
| CN | 1890695 | A | 1/2007 |
| CN | 101044525 | A | 9/2007 |
| CN | 101261672 | A | 9/2008 |
| CN | 103262100 | A | 8/2013 |
| JP | 03-114435 | A | 5/1991 |
| JP | H06309464 | A | 11/1994 |
| JP | 2006-154961 | A | 6/2006 |
| JP | 2007229259 | A | 9/2007 |
| JP | 2008015895 | A | 1/2008 |
| JP | 2009066172 | A | 4/2009 |
| JP | 2011067339 | A | 4/2011 |
| JP | 2013012105 | A | 1/2013 |
| JP | 2015165400 | A | 9/2015 |
| KR | 1019920010261 | A | 6/1992 |
| KR | 1020050056110 | A | 6/2005 |
| KR | 1020110084028 | A | 7/2011 |
| KR | 1020160094713 | A | 8/2016 |
| KR | 1020160123288 | A | 10/2016 |
| MO | I/860 | | 7/2009 |
| MO | I/1446 | | 12/2016 |
| WO | 2007108056 | A1 | 9/2007 |
| WO | 2008120749 | A1 | 10/2008 |
| WO | 2012/091093 | A1 | 7/2012 |
| WO | 2015/107902 | A1 | 7/2015 |
| WO | 2016/191856 | A1 | 12/2016 |

OTHER PUBLICATIONS

European application No. 18152735.9, European search report mailed Apr. 10, 2018.
Invention Publication dated Aug. 13, 2018 issued in PH Application 1-2018-000021.
Notice of Allowance dated Aug. 5, 2020 for U.S. Appl. No. 16/480,168.
Japanese Application No. 2018-564514, JP Office Action mailed Aug. 17, 2021.
Japanese Application No. 2018-564514, JP Office Action mailed Apr. 19, 2022.
Chinese Office Action dated Aug. 16, 2022 issued for CN Application No. 201880008123.6.
Japanese Office Action dated May 30, 2023 issued for JP Application No. 2022-129858.
Korean Office Action dated Dec. 9, 2022 issued for KR Application No. 10-2022-7040469.
Chinese Office Action dated Jan. 31, 2023 issued for CN Application No. 201810064178.0.
Korean Office Action dated Feb. 22, 2023 ssued for KR Application No. 10-2019-7022025.
A third-party submission under 37 CFR 1.290 filed on May 19, 2023 and is being entered in U.S. Appl. No. 17/843,424.
Filipino Office Action dated Jun. 3, 2024 issued for PH Application No. 1-2022-050677.
Filipino Office Action dated Jun. 3, 2024 issued for PH Application No. 1-2022-050676.
Macau Office Action dated Feb. 3, 2025, issued for MO I/001544.
Filipino Invention Publication dated Feb. 24, 2025, issued for PH Application No. 1-2024-050822.

* cited by examiner

CHIP RECOGNITION SYSTEM

CROSS REFERENCE TO RELATED APPLICATIONS

The present application is a continuation of U.S. patent application Ser. No. 17/325,568, filed May 20, 2021, which is a continuation of U.S. patent application Ser. No. 15/877,545, filed Jan. 23, 2018 (now U.S. Pat. No. 11,049,359), which claims priority to JP Pat. App. No. 2017-010135, filed Jan. 24, 2017, the contents of each of which are incorporated herein by reference in their entirety.

BACKGROUND

Technical Field

The present invention relates to a chip recognition system that recognizes stacked chips.

Related Art

In games such as a baccarat game, betting is done by stacking a plurality of chips. Hence, there is a need to correctly recognize the stacked chips.

SUMMARY

The present invention is made in view of such a problem, and an object of the present invention is to provide a chip recognition system capable of accurately recognizing stacked chips.

According to one embodiment, provided is a chip recognition system that recognizes a chip on a gaming table in an amusement place having the gaming table, the chip recognition system comprising: a game recording apparatus that records, as an image, a state of chips stacked on the gaming table, using a camera; an image analysis apparatus that performs an image analysis on the recorded image of the state of chips; a plurality of chip determination apparatuses comprising at least a first artificial intelligence apparatus that determines a number of the chips stacked, using an image analysis result obtained by the image analysis apparatus; and a second artificial intelligence apparatus that decides a correct number of the chips stacked, when the plurality of chip determination apparatuses obtain different determination results for the number of the chips stacked.

By providing the second artificial intelligence apparatus, even if the plurality of chip determination apparatuses provide different determination results for the number of chips, the correct number of chips can be accurately decided.

The plurality of chip determination apparatuses may comprise at least: the first artificial intelligence apparatus that determines a number of the chips stacked, using an image analysis result for a first image, the image analysis result being obtained by the image analysis apparatus; and a third artificial intelligence apparatus that determines a number of the chips stacked, using an image analysis result for a second image, the image analysis result being obtained by the image analysis apparatus and the second image being different from the first image.

Alternatively, the plurality of chip determination apparatuses may comprise at least: the first artificial intelligence apparatus that determines a number of the chips stacked, using an image analysis result obtained by the image analysis apparatus; and a physical measurement determination apparatus that determines a number of the chips stacked, by a physical measurement method different from a method used by the first artificial intelligence apparatus.

Additionally, the plurality of chip determination apparatuses may comprise at least: the first artificial intelligence apparatus that determines a number of the chips stacked, using an image analysis result for a first image, the image analysis result being obtained by the image analysis apparatus; a third artificial intelligence apparatus that determines a number of the chips stacked, using an image analysis result for a second image, the image analysis result being obtained by the image analysis apparatus and the second image being different from the first image; and a physical measurement determination apparatus that determines a number of the chips stacked, by a physical measurement method different from methods used by the first and third artificial intelligence apparatuses.

The physical measurement determination apparatus may determine a number of the chips stacked, using a measurement result that uses trigonometry.

Preferably, the second artificial intelligence apparatus decides a correct number of the chips stacked, using at least one of: a position of the camera used by the game recording apparatus; a number of pixels obtained from the camera; a focal position of the image; and past results obtained by the plurality of chip determination apparatuses.

According to another embodiment, provided is a chip recognition system that recognizes a chip on a gaming table in an amusement place having the gaming table, the chip recognition system comprising: a game recording apparatus that records, as an image, a state of chips stacked on the gaming table, using a camera; an image analysis apparatus that performs an image analysis on the recorded image of the state of chips; a plurality of chip determination apparatuses comprising at least a first artificial intelligence apparatus that determines a number and a type of the chips stacked, using an image analysis result obtained by the image analysis apparatus; and a second artificial intelligence apparatus that decides a correct number or a type of the chips stacked, when the plurality of chip determination apparatuses obtain different determination results for the number or the type of the chips stacked.

By providing the second artificial intelligence apparatus, even if the plurality of chip determination apparatuses provide different determination results for the number or type of chips, the correct number of chips and the correct type of chips can be accurately decided.

The plurality of chip determination apparatuses may comprise at least: the first artificial intelligence apparatus that determines a number and a type of the chips stacked, using an image analysis result for a first image, the image analysis result being obtained by the image analysis apparatus; and a third artificial intelligence apparatus that determines a number and a type of the chips stacked, using an image analysis result for a second image, the image analysis result being obtained by the image analysis apparatus and the second image being different from the first image.

The plurality of chip determination apparatuses may comprise at least: the first artificial intelligence apparatus that determines a number and a type of the chips stacked, using an image analysis result obtained by the image analysis apparatus; and a physical measurement determination apparatus that determines a number of the chips stacked, by a physical measurement method different from a method used by the first artificial intelligence apparatus.

The plurality of chip determination apparatuses may comprise at least: the first artificial intelligence apparatus that determines a number and a type of the chips stacked, using an image analysis result for a first image, the image analysis result being obtained by the image analysis apparatus; a third artificial intelligence apparatus that determines a number and a type of the chips stacked, using an image analysis result for a second image, the image analysis result being obtained by the image analysis apparatus and the second image being different from the first image; and a physical measurement determination apparatus that determines a number of the chips stacked, by a physical measurement method different from methods used by the first and third artificial intelligence apparatuses.

The physical measurement determination apparatus may determine a number of the chips stacked, using a measurement result that uses trigonometry.

Preferably, the second artificial intelligence apparatus decides a correct number or a type of the chips stacked, using at least one of: a position of the camera used by the game recording apparatus; a number of pixels obtained from the camera; a focal position of the image; and past results obtained by the plurality of chip determination apparatuses.

Preferably, the image analysis apparatus is configured such that even if a part of a plurality of stacked chips or a whole of a single chip among the plurality of stacked chips is hidden due to a blind spot of the camera, the image analysis apparatus can obtain information about a type, a number, and a position of the chips.

According to another embodiment, provided is a chip recognition system that recognizes a chip on a gaming table in an amusement place having the gaming table, the chip recognition system comprising: a game recording apparatus that records, as an image, a state of chips stacked on the gaming table, using a camera; an image analysis apparatus that performs an image analysis on the recorded image of the state of chips; a chip determination apparatus comprising an artificial intelligence apparatus that determines a number of chips bet by a player, using an image analysis result obtained by the image analysis apparatus; a physical measurement determination apparatus that determines a number of the chips bet by the player, by a physical measurement method different from a method used by the artificial intelligence apparatus; and a management and control apparatus that controls the image analysis apparatus, the chip determination apparatus, and the physical measurement determination apparatus, wherein the management and control apparatus further has a function of outputting and displaying "undetermined" as a determination result when a determination result for the number of chips obtained from the chip determination apparatus differs from a determination result for the number of chips obtained from the physical measurement determination apparatus.

The physical measurement determination apparatus may determine a number of the chips using a measurement result that uses trigonometry.

According to another embodiment, provided is a chip recognition system that recognizes a chip on a gaming table in an amusement place having the gaming table, the chip recognition system comprising: a plurality of cameras that obtain images of a chip bet by a player from different positions or different angles; a game recording apparatus that records, as images, a state of chips stacked on the gaming table, using the plurality of cameras; an image analysis apparatus that performs an image analysis on the recorded images of the state of chips; a plurality of chip determination apparatuses comprising at least a first artificial intelligence apparatus that determines a number of the chips stacked, using an image analysis result obtained by the image analysis apparatus; and a management and control apparatus that controls the image analysis apparatus and the plurality of chip determination apparatuses, wherein the management and control apparatus further has a second artificial intelligence apparatus function of analyzing the images in the game recording apparatus when the plurality of chip determination apparatuses obtain different determination results for the number of the chips stacked, to determine whether the difference in determination result is caused by a stacking state of the chips stacked on the gaming table, and decides a correct number of the chips stacked, based on the determination results obtained by the respective plurality of chip determination apparatuses.

Chips can be accurately recognized.

DETAILED DESCRIPTION

An embodiment according to the present invention will be specifically described below with reference to the drawings.

First, a game that is played in an amusement place having a gaming table 10 will be described. Although the present embodiment shows an example in which the gaming table 10 is a baccarat table and a baccarat game is played, the present invention is also applicable to other amusement places or other games.

Figure 1:
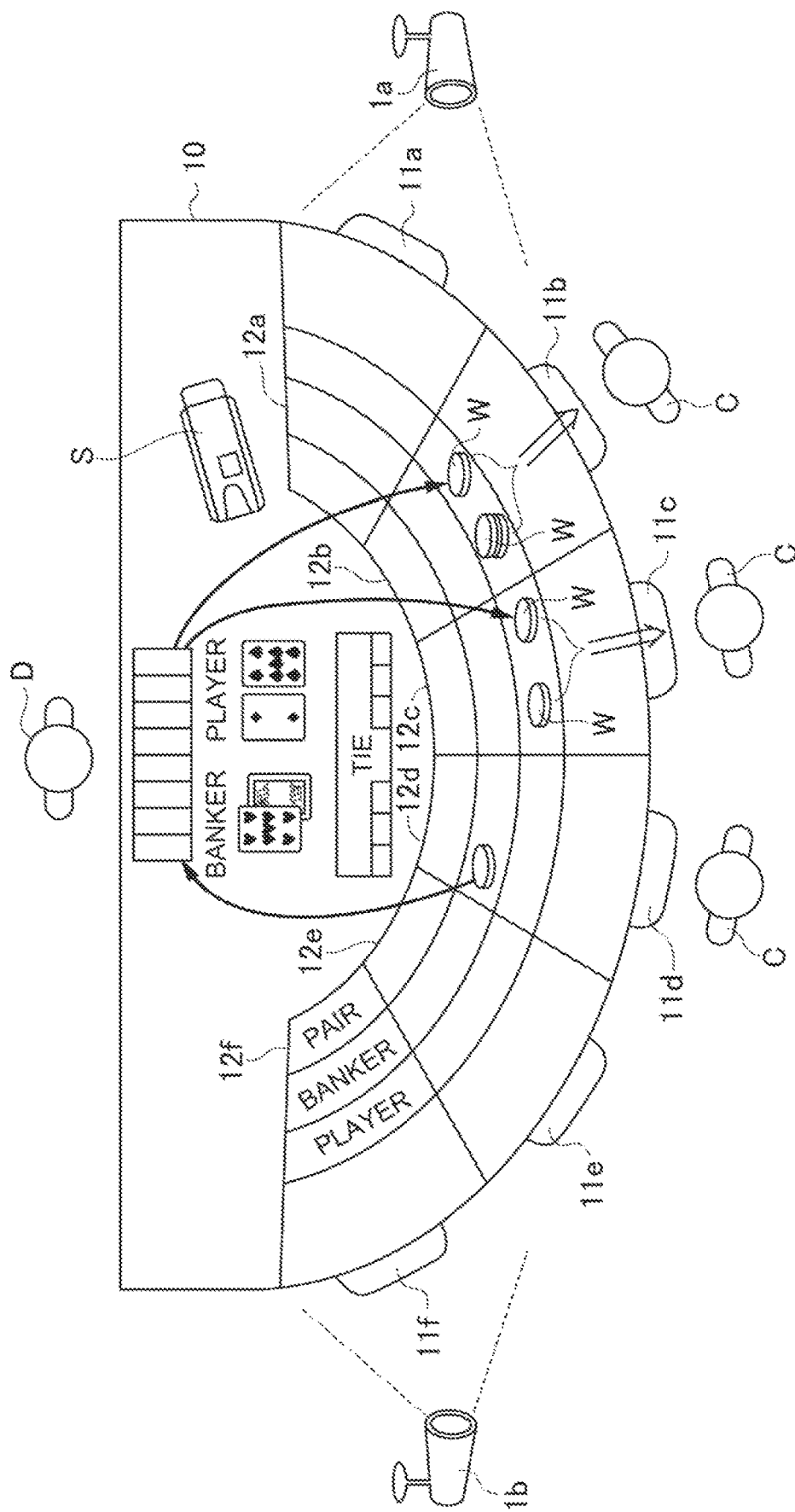
FIG. 1 is a diagram schematically showing an amusement place.

FIG. 1 is a diagram schematically showing an amusement place. As shown in the drawing, in the amusement place there are disposed a substantially semicircular gaming table 10 and chairs 11 which are arranged along the arc side of the gaming table 10 so as to face a dealer D. The number of the chairs 11 is any. In the example of FIG. 1, six chairs 11 are provided (they are called chairs 11a to 11f in order from the right side on the paper of the gaming table 10, and are collectively called chairs 11). In addition, betting areas 12 are provided on the gaming table 10 for the respective chairs 11 (they are called betting areas 12a to 12f in order from the right side on the paper of the gaming table 10, and are collectively called betting areas 12). Namely, the six betting areas 12a to 12f are arranged in an arc-like manner.

Then, customers (players) C sit in the respective chairs 11a to 11f. Each customer (player) C bets on a Player win, a Banker win, or a Tie as the winning or losing outcome of the baccarat game (this is hereinafter referred to as "bet") by stacking chips W in a betting area 12 provided in front of a chair 11 in which the customer (player) C sits.

There may be only one type of chips W to bet or there may be a plurality of types of chips W to bet. In addition, the number of chips W to bet may be arbitrarily decided by the customers (players) C. The present embodiment is to recognize the number (furthermore, the type) of stacked chips W.

Figure 2:
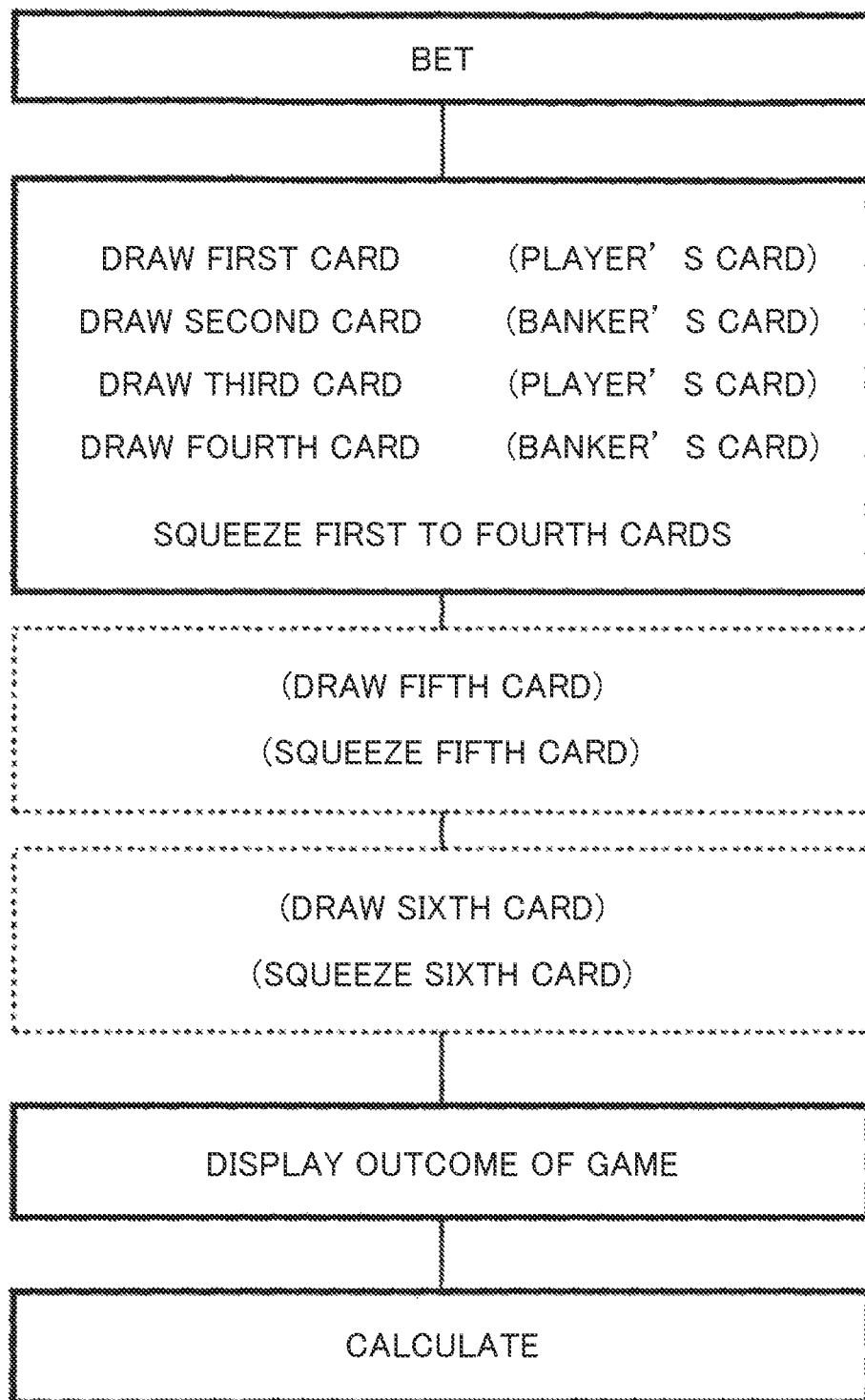
FIG. 2 is a diagram showing the progress of a baccarat game.

The dealer D calls "No more bets" at the right time to end betting by the customers (players) C and, for example, moves his/her hand in a crosswise direction. Then, the dealer D draws cards one by one from a card shooter apparatus S onto the gaming table 10. As shown in FIG. 2, the first card is a Player's hand, the second card is a Banker's hand, the third card is a Player's hand, and the fourth card is a Banker's hand (the drawing of the first to fourth cards is hereinafter referred to as "dealing").

Note that since all cards are drawn face down from the card shooter apparatus S, neither the dealer D nor customers (players) C can grasp ranks (numbers) or suits (hearts, diamonds, spades, or clubs).

After the fourth card is drawn, a customer (player) C who has bet on the Player (if there are a plurality of customers C who have bet on the Player, a customer C with the highest bet, and if there is no customer C who has bet on the Player, the dealer D) turns over the face-down first and third cards face up. Likewise, a customer (player) C who has bet on the Banker (if there are a plurality of customers C who have bet on the Banker, a customer C with the highest bet, and if there is no customer C who has bet on the Banker, the dealer D) turns over the second and fourth cards face up (in general, the turning over of a face-down card face up is called "squeezing").

Then, based on the ranks (numbers) of the first to fourth cards and the detailed rules of the baccarat game, the dealer D draws the fifth card and further the sixth card, and each of these cards becomes a Player's or Banker's hand. In the same manner as above, a customer (player) C who has bet on the Player squeezes a card that is the Player's hand, and a customer (player) C who has bet on the Banker squeezes a card that is the Banker's hand.

A period of time before winning and losing outcomes are found out by squeezing the fifth and sixth cards after drawing the first to fourth cards is a thrilling time for the customers (players) C.

Furthermore, depending on the ranks (numbers) of cards, winning and losing may be decided by the first to fourth cards, or winning and losing may be finally decided by the fifth card or further by the sixth card. Based on the ranks (numbers) of the squeezed cards, the dealer D grasps that winning and losing are decided and grasps winning and losing outcomes, and performs a task such as pressing a winning and losing outcome display button on the card shooter apparatus S to display the winning and losing outcomes on a monitor to show the customers (players) C the winning and losing outcomes.

In addition, at the same time, a winning and losing determiner included in the card shooter apparatus S determines the winning and losing outcomes of the game. If, despite the fact that winning and losing have been decided, the dealer D further attempts to draw a card without displaying the winning and losing outcomes, an error occurs. The card shooter apparatus S detects the error and outputs an error signal. Finally, during a period during which the winning and losing outcomes are displayed, the dealer D calculates bets made by the customers (players) C, and makes payouts to winning customers (players) C and collects bets from losing customers (players) C. After the completion of the calculation, the display of the winning and losing outcomes is terminated, and betting for the next game starts.

Note that the flow of the above-described baccarat game is widely done in general casinos, and the card shooter apparatus S is an existing card shooter apparatus that is configured to read a card to be drawn while being structured such that a card is drawn out by a hand of the dealer D, and that further includes an outcome display button and an outcome display module and has a function of making a winning and losing determination and displaying winning and losing outcomes. As described above, the card shooter apparatus S, a monitor, etc., are disposed for each of a plurality of gaming tables 10 arranged on a general casino floor, and cards to be used are supplied in units of packages or sets or further in units of cartons on each gaming table 10 or in a cabinet 210 below the gaming table 10 and utilized.

The present embodiment relates to a chip recognition system that recognizes chips W that are stacked in the betting areas 12 by the customers (players) C, and more specifically to a chip recognition system that recognizes the number and/or type of chips W.

The chip recognition system includes a single or a plurality of (two in the example of FIG. 1) cameras 1a and 1b. The camera 1a is disposed on the right side on the paper of the gaming table 10 and shoots the betting areas 12. On the other hand, the camera 1b is disposed on the left side on the paper of the gaming table 10 and shoots the betting areas 12. Note that the disposition positions of the cameras 1a and 1b are merely exemplification, and the cameras 1a and 1b may be disposed in any position in which the cameras 1a and 1b can shoot the betting areas 12.

The camera 1a may shoot only a part of the betting areas 12a to 12f, but it is desirable that the camera 1a shoot all of the betting areas 12a to 12f. When the camera 1a shoots a plurality of betting areas 12, it is expected that a sharp image can be obtained for betting areas 12 close to the camera 1a, but it is also considered that an unsharp image is obtained for betting areas 12 far from the camera 1a. In addition, it is expected that a sharp image can be obtained for betting areas 12 that are in focus of the camera 1a, but it is also considered that an unsharp image is obtained for betting areas 12 that are out of focus of the camera 1a. The same things can also be said for the camera 1b.

Chips W are recognized using images obtained by shooting with the cameras 1a and 1b. Use of a sharp image increases the accuracy of recognition of the chips W and use of an unsharp image reduces the accuracy of recognition of the chips W.

Figure 3:
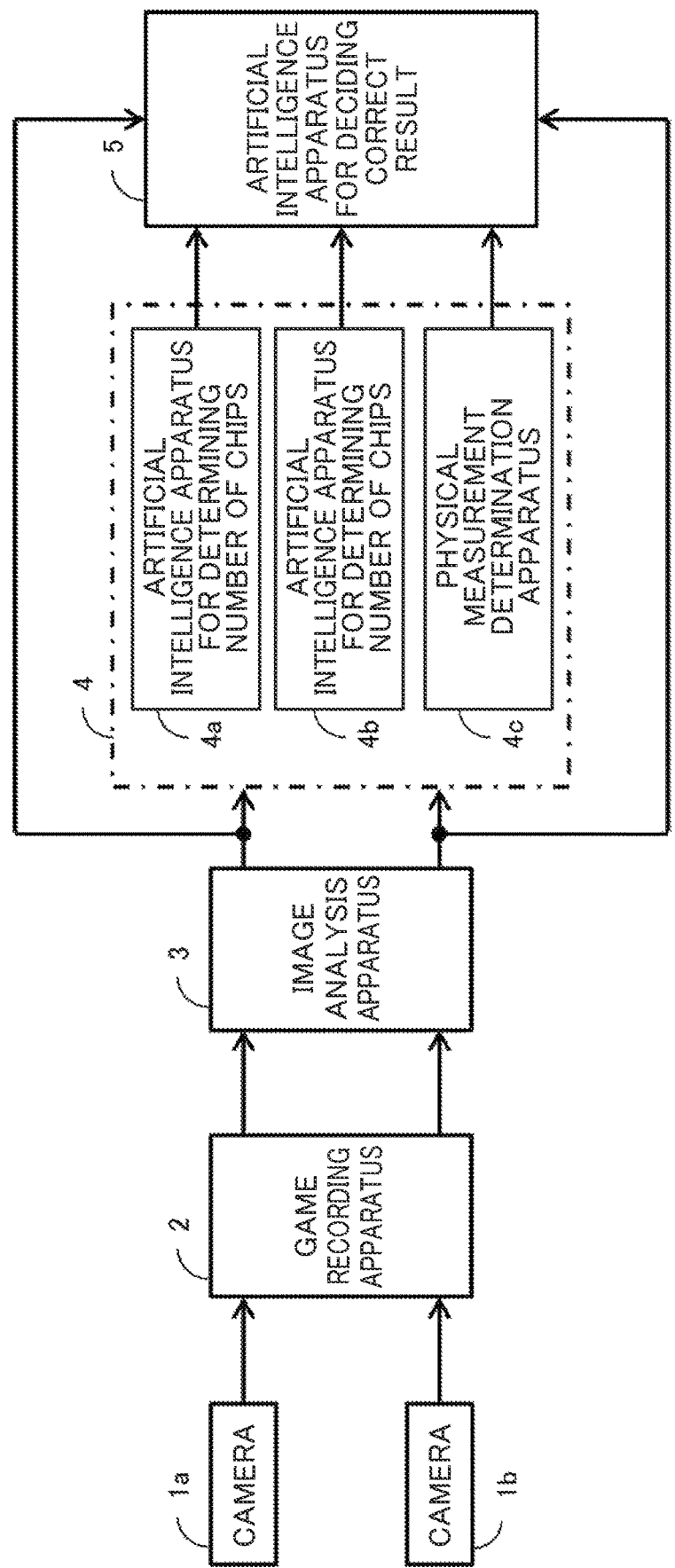
FIG. 3 is a block diagram showing a schematic configuration of a chip recognition system.

FIG. 3 is a block diagram showing a schematic configuration of a chip recognition system. The chip recognition system is to recognize chips W on a gaming table 10 in an amusement place having the gaming table 10, and includes cameras 1a and 1b, a game recording apparatus 2, an image analysis apparatus 3, a plurality of chip determination apparatuses 4, and an artificial intelligence apparatus for deciding a correct result 5.

As described above, the cameras 1a and 1b shoot chips W stacked in the betting areas 12 on the gaming table 10. Images obtained by the shooting are transmitted to the game recording apparatus 2 by wireless communication or wired communication.

The game recording apparatus 2 records, as images, the state of chips W stacked in a game which is played on the gaming table 10, using the cameras 1a and 1b. Namely, the game recording apparatus 2 records the images shot with the cameras 1a and 1b.

The image analysis apparatus 3 performs an image analysis on the recorded images of the state of chips W. For example, the image analysis apparatus 3 performs filtering by the size (the number of pixels), shape (pattern matching), etc., of an assumed target (chip W) to make a distinction between the chips W and a background. It is desirable that the image analysis apparatus 3 be structured such that even if some or a single whole chip W of a plurality of chips W stacked in the betting areas 12 are/is hidden due to the blind spots of the cameras 1a and 1b, the image analysis apparatus 3 can obtain information about the type, number, and position of the chips W. Specifically, this becomes possible by artificial intelligence by teaching the artificial intelligence an image and the number of chips in the image as teacher data.

The plurality of chip determination apparatuses 4 include, for example, two artificial intelligence apparatuses for determining the number of chips 4a and 4b and a physical measurement determination apparatus 4c. Note that the plurality of chip determination apparatuses 4 may include only two artificial intelligence apparatuses for determining the number of chips 4a and 4b, or may include only one artificial intelligence apparatus for determining the number of chips 4a and the physical measurement determination apparatus 4c, or may include three or more artificial intelligence apparatuses for determining the number of chips, or may include an apparatus that determines the number of chips by a different technique.

In order that the artificial intelligence apparatuses for determining the number of chips 4a and 4b can determine the number of chips W using an image analysis result obtained by the image analysis apparatus 3, the artificial intelligence apparatuses for determining the number of chips 4a and 4b are subjected to pre-learning.

The artificial intelligence apparatus for determining the number of chips 4a determines, using artificial intelligence, the number of stacked chips W, using a result that is shot with the camera 1a and recorded as an image and further subjected to an image analysis. On the other hand, the artificial intelligence apparatus for determining the number of chips 4b determines, using artificial intelligence, the number of stacked chips W, using a result that is shot with the camera 1b and recorded as an image (i.e., an image different from the image shot with the camera 1a) and further subjected to an image analysis.

The physical measurement determination apparatus 4c determines the number of chips W by a physical measurement method without using artificial intelligence. For a specific example of the physical measurement method, the number of chips W may be determined based on the height of the stacked chips W which is obtained by applying trigonometry to the images shot with the cameras 1a and 1b. Furthermore, specifically, the number of chips W can be determined by computing, using trigonometry, the angles of vision from the cameras 1a and 1b, the position of the chips W in the images, and a horizontal distance. Specific description will be made below.

Figure 4:
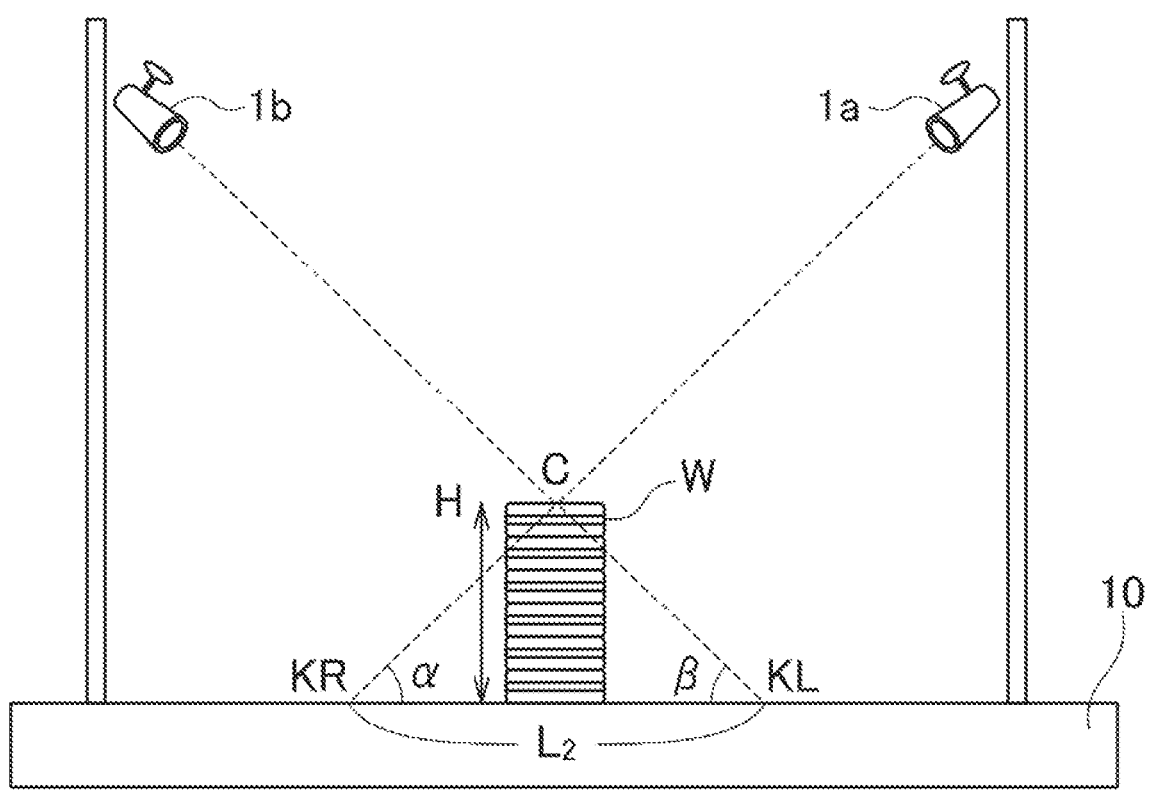
FIG. 4 is a diagram describing a method of determining the number of chips using trigonometry.

In FIG. 4, it is assumed that the cameras 1a and 1b and chips W are present in the same plane perpendicular to the gaming table 10. A relational expression between an angle α formed by a straight line connecting the camera 1a to the center C of the top chip W and the gaming table 10, an angle β formed by a straight line connecting the camera 1b to the center C of the top chip W and the gaming table 10, a distance L between a point of intersection KR of the straight line connecting the camera 1a to the center C of the top chip W and the gaming table 10 and a point of intersection KL of the straight line connecting the camera 1b to the center C of the top chip W and the gaming table 10, and a height H of the stacked chips W is represented by the following equation (1):

$$L = H/\tan\alpha + H/\tan\beta \qquad (1)$$

Here, the distance L and the angles α and β are found by the following method. The points of intersection KR and KL are positions where the center C of the top chip W is projected onto the gaming table 10 as viewed from the angles of view of the cameras 1a and 1b. Therefore, the points of intersection KR and KL are obtained by obtaining, by image processing, the center of the outline of the top chip W in images shot with the cameras 1a and 1b. Furthermore, by obtaining an image of the gaming table 10 looked down from immediately above by performing image processing on the images shot with the cameras 1a and 1b, the distance L between the points of intersection KR and KL is obtained. Furthermore, if the positions of the points of intersection KR and KL are known, then since the heights of the cameras 1a and 1b from the gaming table 10 are fixed, the angles α and β can be obtained. By the above, the height H of the stacked chips W can be obtained using the distance L and angles α and β obtained above and by the following equation (2) which is a modified version of the above-described equation (1):

$$H = (\tan\alpha \times \tan\beta)/((\tan\alpha + \tan\beta))L \qquad (2)$$

Figure 5:
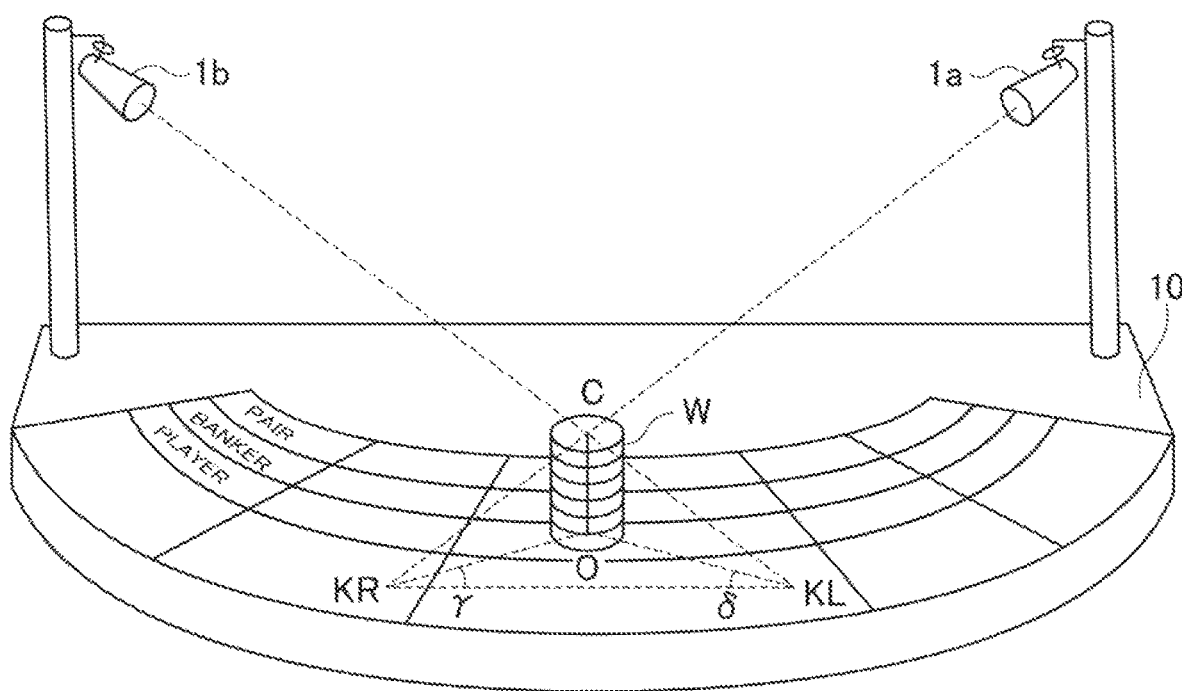
FIG. 5 is a diagram describing a method of determining the number of chips using trigonometry.

Although the above assumes that the cameras 1a and 1b and the chips W are present in the same plane perpendicular to the gaming table 10 for simplification of description, even when the cameras 1a and 1b and the chips W are not present in the same plane perpendicular to the gaming table 10, computation can be performed in the same manner in FIG. 5. Given that the point of intersection of a perpendicular line from the center C to the gaming table 10 with the gaming table 10 is O, the angle formed by a straight line connecting the points of intersection O and KR and a straight line connecting the points of intersection KR and KL is γ, and the angle formed by a straight line connecting the points of intersection O and KL and the straight line connecting the points of intersection KR and KL is δ, though detailed computation is omitted, the height H is represented by the following equation (2'):

$$H = \tan\alpha \tan\beta/(\tan\alpha\cos\delta + \tan\beta\cos\gamma)L \qquad (2')$$

By obtaining the height H of stacked chips W by the methods shown above, the number of chips W with a predetermined thickness t can be obtained by H/t.

Referring back to FIG. 3, the artificial intelligence apparatus for deciding a correct result 5 has learned in advance which one of determination results obtained by the artificial intelligence apparatuses for determining the number of chips 4a and 4b and the physical measurement determination apparatus 4c which are included in the plurality of chip determination apparatuses 4 is more likely to be correct for what image based on which the number of chips W is determined. Then, when the artificial intelligence apparatus for deciding a correct result 5 obtains different determination results for the number of chips W from the artificial intelligence apparatuses for determining the number of chips 4a and 4b and the physical measurement determination apparatus 4c, the artificial intelligence apparatus for deciding a correct result 5 decides the correct number of chips W using artificial intelligence. Upon this decision, the artificial intelligence apparatus for deciding a correct result 5 uses images that are used by the artificial intelligence apparatuses for determining the number of chips 4a and 4b to determine the number of chips W.

The artificial intelligence apparatus for deciding a correct result 5 may decide the correct number of chips W, taking into account the positions of the cameras 1a and 1b used by the game recording apparatus 2. For example, the camera 1a is close to the betting area 12a and is far from the betting area 12f (see FIG. 1). Hence, when the artificial intelligence apparatus for deciding a correct result 5 determines the number of chips W stacked in the betting area 12a, the artificial intelligence apparatus for deciding a correct result 5 may decide the number of chips W obtained as a result of determination by the artificial intelligence apparatus for determining the number of chips 4a that uses an image from the camera 1a, instead of by the artificial intelligence apparatus for determining the number of chips 4b that uses an image from the camera 1b, to be correct.

In addition, the artificial intelligence apparatus for deciding a correct result 5 may decide the correct number of chips W, taking into account the numbers of pixels obtained from the cameras 1a and 1b, etc. For example, either one of the cameras 1a and 1b may be selected by comparing the numbers of pixels or the degrees of focus which are obtained from the cameras 1a and 1b. Namely, when focus is achieved, an edge becomes sharp and thus contrast becomes clear, making it easier to obtain the correct number of chips W by image processing. Hence, for example, when different determination results are obtained for the cameras 1a and 1b, in general, it is highly likely that a camera that achieves better focus shows the correct number of chips W.

Alternatively, the artificial intelligence apparatus for deciding a correct result 5 may decide the correct number of chips W, taking into account the focal positions of images shot with the cameras 1a and 1b. For example, it is assumed that upon determining the number of chips W stacked in the betting area 12b, the focus of the camera 1a is located in the betting area 12b and the focus of the camera 1b is located in the betting area 12f. In this case, the artificial intelligence apparatus for deciding a correct result 5 may decide the number of chips W obtained as a result of determination by the artificial intelligence apparatus for determining the number of chips 4a that uses an image from the camera 1a, instead of by the artificial intelligence apparatus for determining the number of chips 4b that uses an image from the camera 1b, to be correct.

In addition, the artificial intelligence apparatus for deciding a correct result 5 may decide the correct number of chips W, taking into account the past results obtained by the artificial intelligence apparatuses for determining the number of chips 4a and 4b and the physical measurement determination apparatus 4c. For example, when the physical measurement determination apparatus 4c has a higher past correctness rate than the artificial intelligence apparatuses for determining the number of chips 4a and 4b, the artificial intelligence apparatus for deciding a correct result 5 may decide the number of chips W obtained as a result of determination by the physical measurement determination apparatus 4c to be correct.

As such, the artificial intelligence apparatus for deciding a correct result 5 can decide a correct result using various elements. Two or more of the exemplified positions of the cameras 1a and 1b, numbers of pixels obtained from the cameras 1a and 1b, focal positions of images, and past results may be combined, or other information may be further used.

Figure 6:
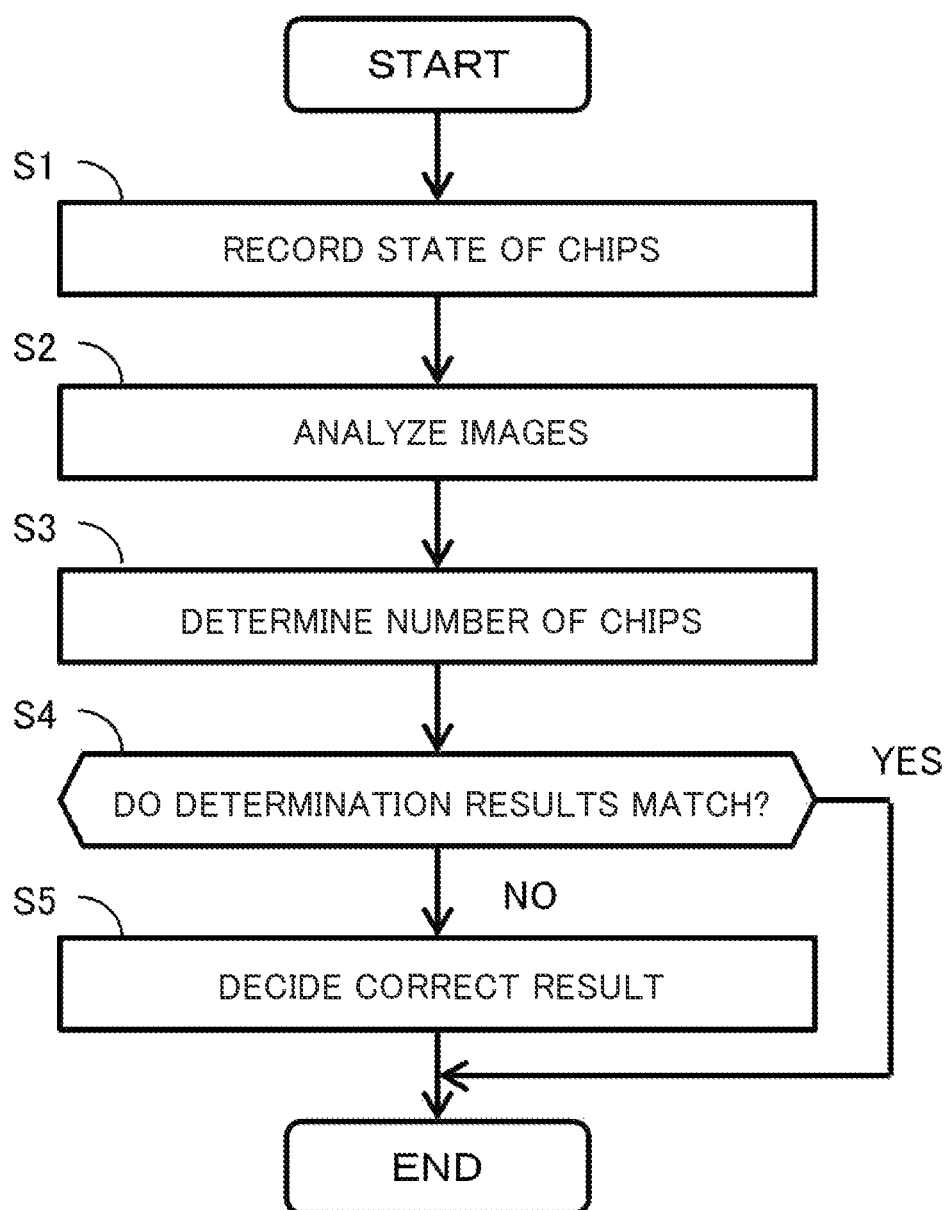
FIG. 6 is a flowchart showing a technique for recognizing chips.

FIG. 6 is a flowchart showing a technique for recognizing chips W. First, the cameras 1a and 1b shoot the state of chips W, and the game recording apparatus 2 records images representing the state of chips W (step S1). Subsequently, the image analysis apparatus 3 analyzes the recorded images (step S2). Then, each of the artificial intelligence apparatuses for determining the number of chips 4a and 4b and the physical measurement determination apparatus 4c which are included in the plurality of chip determination apparatuses 4 determines the number of chips W using an image analysis result (step S3).

Here, if determination results for the number of chips W which are obtained by the artificial intelligence apparatuses for determining the number of chips 4a and 4b and the physical measurement determination apparatus 4c match (YES at step S4), the determination results are used as the number of chips W. On the other hand, if the determination results do not match (NO at step S4), the artificial intelligence apparatus for deciding a correct result 5 decides which one of the determination results is correct, i.e., decides the correct number of chips W (step S5).

As such, in the present embodiment, the plurality of chip determination apparatuses 4 are provided, and furthermore, the artificial intelligence apparatus for deciding a correct result 5 is provided. Hence, even when the plurality of chip determination apparatuses 4 provide different determination results, the number of chips W can be accurately decided by the artificial intelligence apparatus for deciding a correct result 5.

Note that the above-described embodiment is to decide the number of chips W. However, both the type and number of chips W may be decided. For example, the artificial intelligence apparatuses for determining the number of chips 4a and 4b may have learned in advance to determine the type and number of chips W, and determine both the type and number using images having been subject to an image analysis. In that case, if the types of chips W indicated by determination results do not match, the artificial intelligence apparatus for deciding a correct result 5 may further decide the correct type of chips W.

In addition, the chip recognition system may include a management and control apparatus that controls at least some of the game recording apparatus 2, the image analysis apparatus 3, the chip determination apparatuses 4, and the artificial intelligence apparatus for deciding a correct result 5.

For example, when determination results for the number (and/or type, the same also applies below) of chips W which are obtained from the artificial intelligence apparatuses for determining the number of chips 4a and 4b differ from a determination result for the number of chips W which is obtained from the physical measurement determination apparatus 4c, the management and control apparatus may output and display "undetermined" as a determination result.

In addition, when the chip determination apparatuses 4 obtain different determination results for the number of chips W, the management and control apparatus may analyze images in the game recording apparatus 2 to determine whether the difference in determination result is caused by the stacking state of chips W stacked on the gaming table 10, and decide the correct number of chips W based on the determination results obtained by the respective chip determination apparatuses 4. The management and control apparatus may have an artificial intelligence apparatus function and use the artificial intelligence apparatus function for the decision.

The above-described embodiment is described with the aim of allowing a person of ordinary knowledge in the technical field to which the present invention belongs to carry out the present invention. Various variants of the above-described embodiment can be made as a matter of course by a person skilled in the art, and the technical idea of the present invention can also be applied to other embodiments. Therefore, the present invention should not be construed as being limited to the described embodiment, but should be construed as having the widest range according to the technical idea defined by the claims.

What is claimed is:

1. A chip recognition system for a gaming table, the chip recognition system comprising:
a first game recording apparatus configured to capture a first image of chips stacked on the gaming table diagonally from above;
a second game recording apparatus configured to capture a second image of the chips stacked on the gaming table diagonally from above; and
at least one processor configured to:
perform an image analysis of the first image using an artificial intelligence technology and an image analysis of the second image using an artificial intelligence technology;
determine, based on results of the respective image analyses, a first number of the chips in the first image and a second number of the chips in the second image; and
decide, when the first number is different from the second number, a correct number of the chips stacked on the gaming table based on the first number and the second number.

2. The chip recognition system according to claim 1, wherein:
the first game recording apparatus includes a first camera,
the second game recording apparatus includes a second camera, and
the first camera and the second camera are installed in different locations and/or at different angles such that the first camera and the second camera capture different aspects of same chips of the chips stacked on the gaming table, thereby there are one or more chips that are detected by the image analysis of the first image but are not detected by the image analysis of the second image.

3. The chip recognition system according to claim 2, wherein the decision of the correct number is obtained based on:
respective positions of the first camera and the second camera, or
respective numbers of pixels of the first camera and the second camera.

4. The chip recognition system according to claim 2, wherein the decision of the correct number is obtained based on respective positions of the first camera and the second camera.

5. The chip recognition system according to claim 2, wherein the decision of the correct number is obtained based on respective numbers of pixels of the first camera and the second camera.

6. The chip recognition system according to claim 1, wherein the decision of the correct number is obtained based on:
respective focal positions of the first image and the second image,
definitions of the first image and the second image, or
past results of numbers of chips stacked on the gaming table obtained by the at least one processor respectively based on the first game recording apparatus and the second game recording apparatus.

7. The chip recognition system according to claim 1, wherein the first game recording apparatus and the second game recording apparatus each include a respective camera, and the at least one processor is configured to determine information about the number, a type, and a position of the chips stacked on the gaming table even when a part or an entirety of one or more of the chips is hidden due to a blind spot of at least one camera of the first game recording apparatus or at least one camera of the second game recording apparatus.

8. The chip recognition system according to claim 1, wherein the at least one processor is configured to:
determine, based on results of the respective image analyses of the first image and the second image, a respective type of at least one chip in the first image and the second image; and
decide a correct type of each of the at least one chip of the chips stacked on the gaming table based on the respective types determined from the first image and the second image.

9. The chip recognition system according to claim 8, wherein the at least one processor is configured to decide a correct type of each of the at least one chip of the chips stacked on the gaming table when the respective types determined from the first image and the second image are different from each other.

10. The chip recognition system according to claim 8, wherein:
the first game recording apparatus includes a first camera,
the second game recording apparatus includes a second camera, and
the first camera and the second camera are installed in different locations and/or at different angles such that the first camera and the second camera capture different aspects of same chips of the chips stacked on the gaming table thereby there are one or more chips that are detected by the image analysis of the first image but are not detected by the image analysis of the second image.

11. The chip recognition system according to claim 10, wherein the decision of the correct at least one type is obtained based on:
respective positions of the first camera and the second camera, or
respective numbers of pixels of the first camera and the second camera.

12. The chip recognition system according to claim 8, wherein the decision of the correct at least one type is obtained based on:
respective focal positions of the first image and the second image,
definitions of the first image and the second image, or
past results of one or more types of chips stacked on the gaming table obtained by the at least one processor respectively based on the first game recording apparatus and the second game recording apparatus.

13. The chip recognition system according to claim 8, wherein the first game recording apparatus and the second game recording apparatus include respective cameras, and the at least one processor is configured to determine information about a number, the at least one type, and a position of the chips stacked on the gaming table even when a part or an entirety of one or more of the chips is hidden due to a blind spot of at least one of the cameras of the first game recording apparatus or the second game recording apparatus.

14. The chip recognition system according to claim 1, wherein the decision of the correct number is obtained based on respective focal positions of the first image and the second image.

15. The chip recognition system according to claim 1, wherein the decision of the correct number is obtained based on past results of numbers of chips stacked on the gaming table obtained by the at least one processor respectively based on the first game recording apparatus and the second game recording apparatus.

16. A chip recognition system for a gaming table, the chip recognition system comprising:
- a first camera configured to capture a first image of chips stacked on the gaming table diagonally from above;
- a second camera configured to capture a second image of the chips stacked on the gaming table diagonally from above; and
- at least one processor configured to:
    - perform an image analysis of the first image using an artificial intelligence technology to determine a first number of the chips in the first image;
    - perform an image analysis of the second image using an artificial intelligence technology to determine a second number of the chips in the second image; and
    - decide, when the first number is different from the second number, a correct number of the chips stacked on the gaming table based on the first number and the second number,
    - wherein the first camera and the second camera are installed in different locations and/or at different angles such that the first camera and the second camera capture different aspects of same chips of the chips stacked on the gaming table, thereby there are one or more chips that are detected by the image analysis of the first image but are not detected by the image analysis of the second image.

\* \* \* \* \*